(No Model.) 4 Sheets—Sheet 1.
D. A. VANHORNE.
BODY AND SEAT FOR VEHICLES.
No. 314,499. Patented Mar. 24, 1885.
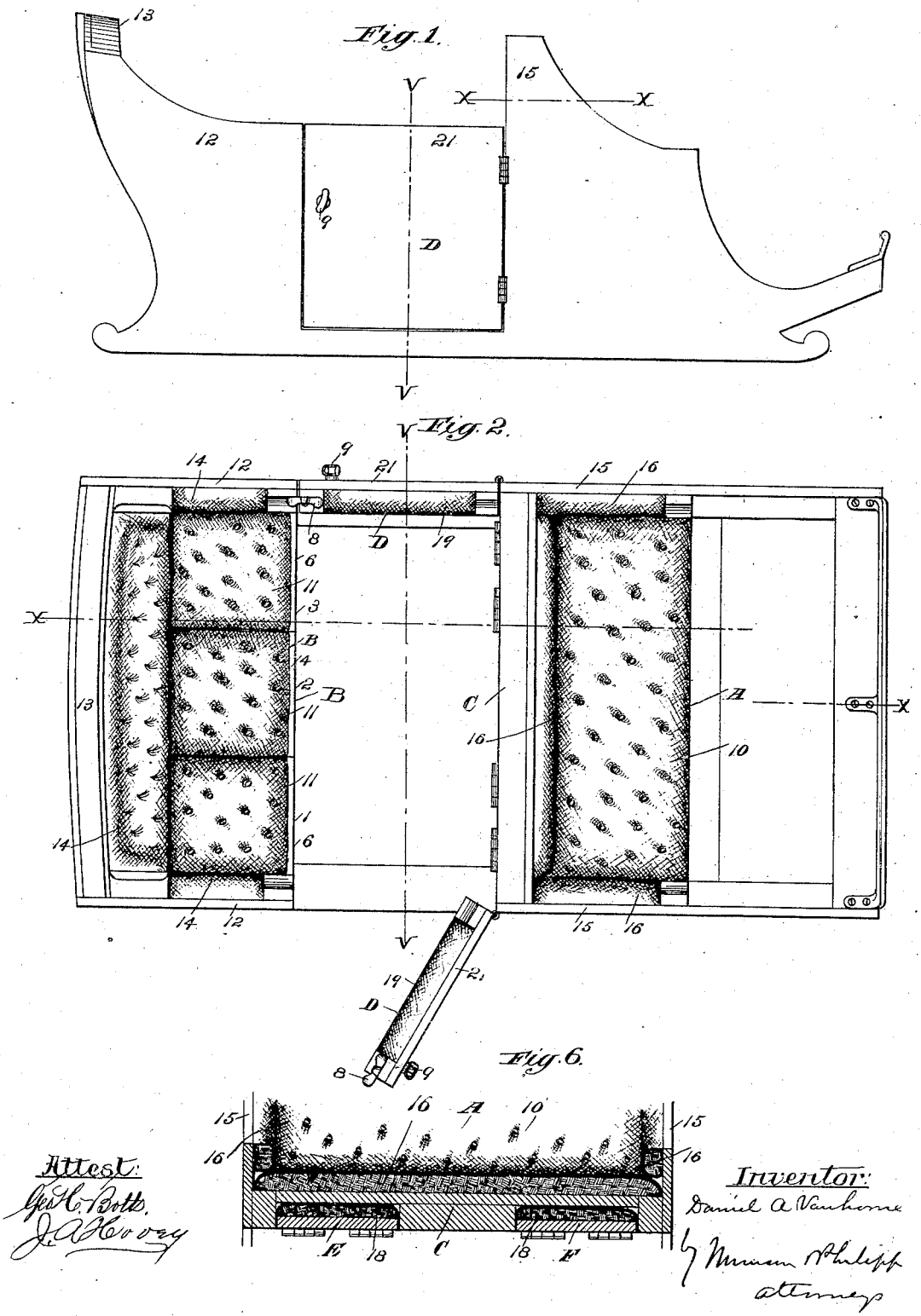

(No Model.) 4 Sheets—Sheet 2.
D. A. VANHORNE.
BODY AND SEAT FOR VEHICLES.
No. 314,499. Patented Mar. 24, 1885.
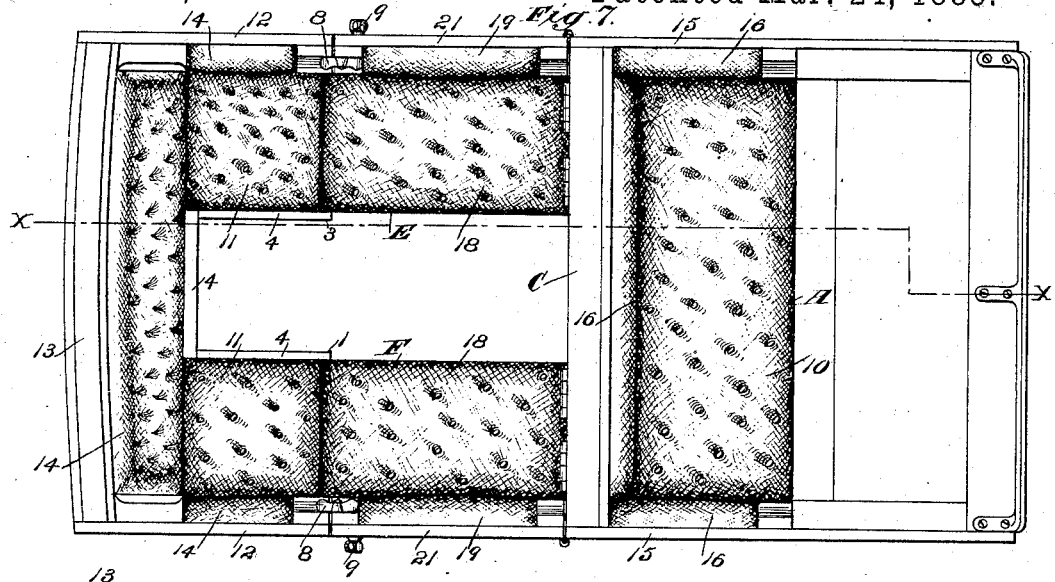
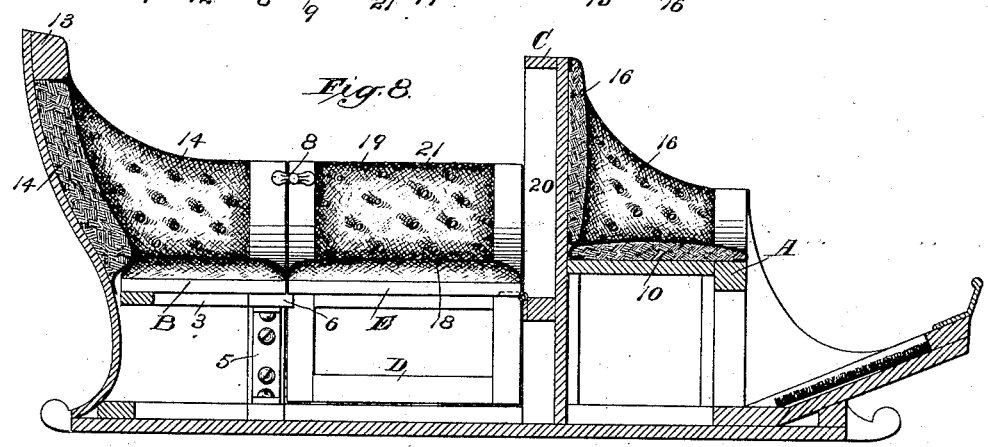
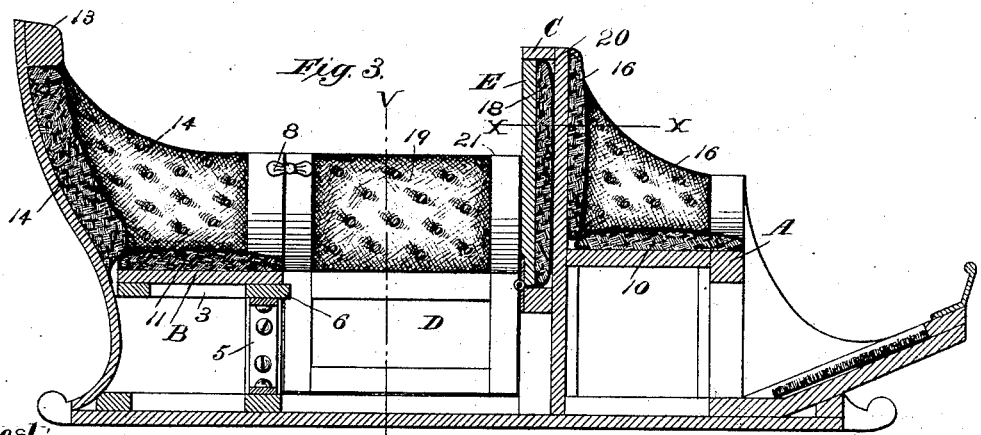
Attest:
Geo. H. Botts
J. A. Hovey
Inventor:
Daniel A. Vanhorne
by Munson & Philipp
attorneys (No Model.) 4 Sheets—Sheet 3.
D. A. VANHORNE.
BODY AND SEAT FOR VEHICLES.
No. 314,499. Patented Mar. 24, 1885.
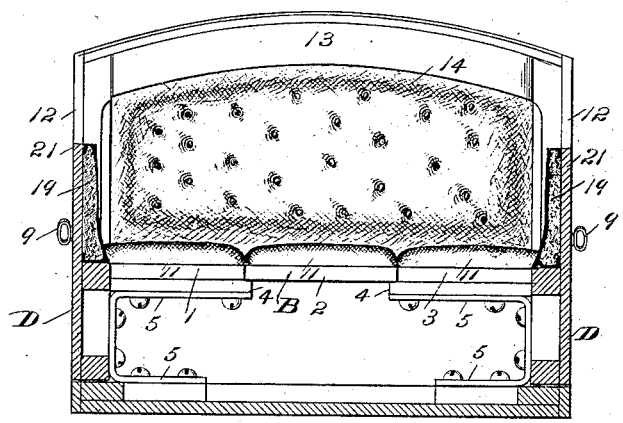
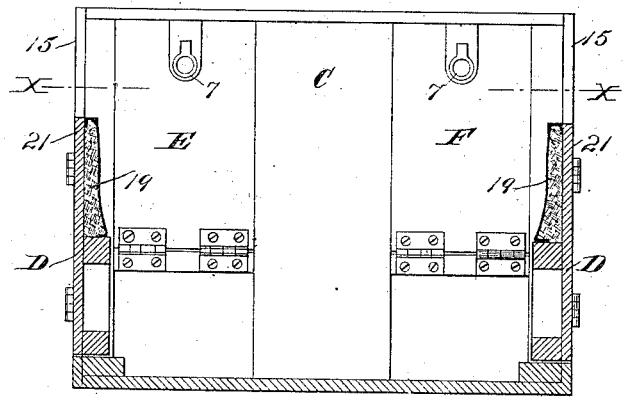
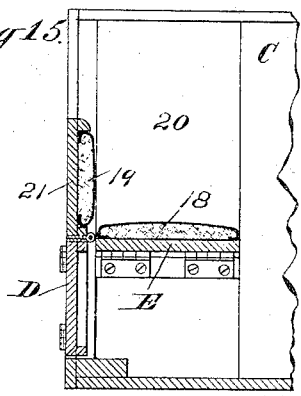 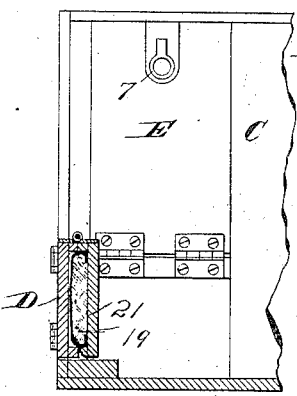
Attest:
Geo. H. Botts.
J. A. Hovey
Inventor:
Daniel A. Vanhorne
by Munson Philipp
attorneys (No Model.)  4 Sheets—Sheet 4.
D. A. VANHORNE.
BODY AND SEAT FOR VEHICLES.
No. 314,499.  Patented Mar. 24, 1885.
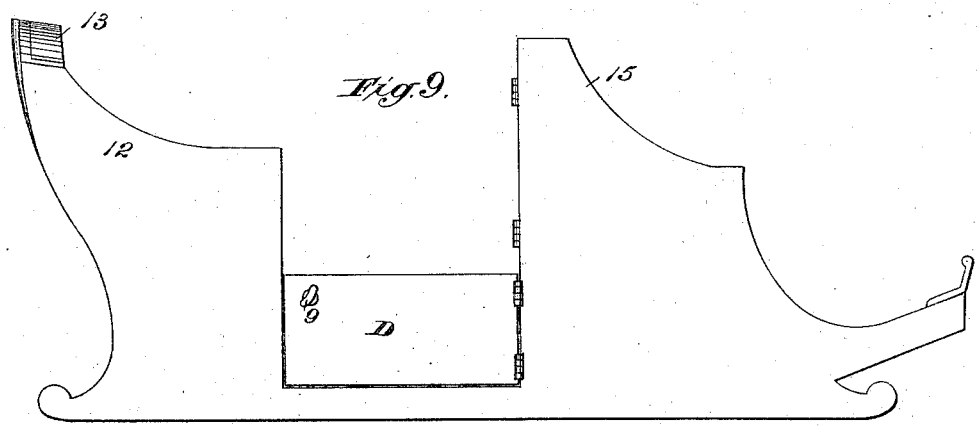
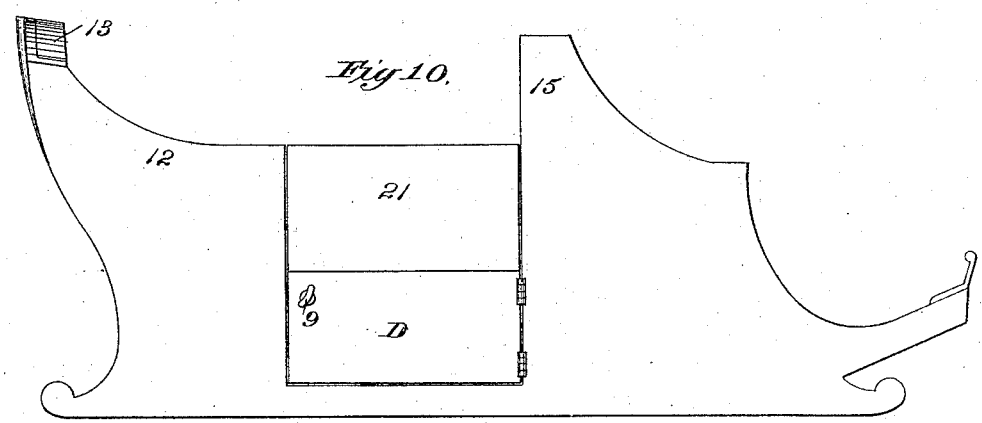
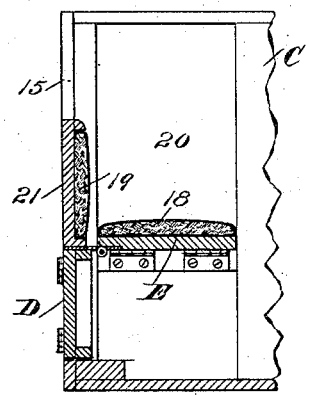
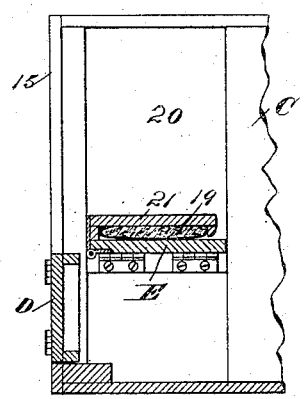
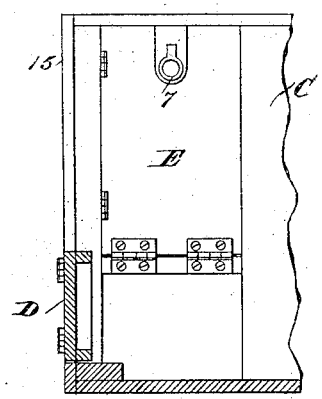
Attest:
Geo. H. Botts.
J. A. Heovay
Inventor.
Daniel A. Vanhorne
by Munson Philipp
Attorneys

UNITED STATES PATENT OFFICE.

DANIEL A. VANHORNE, OF ORANGE, NEW JERSEY.

BODY AND SEAT FOR VEHICLES.

SPECIFICATION forming part of Letters Patent No. 314,499, dated March 24, 1885.

Application filed October 29, 1884. (No model.)

*To all whom it may concern:*

Be it known that I, DANIEL A. VANHORNE, a citizen of the United States, residing at Orange, county of Essex, and State of New Jersey, have invented certain new and useful Improvements in Bodies and Seats for Vehicles, fully described and represented in the following specification and the accompanying drawings, forming a part of the same.

This invention relates to the construction of the seats and bodies of carriages, sleighs, and other vehicles, it being the principal object of the invention to provide means by which the seating capacity of the vehicle can be varied so as to accommodate a greater or less number of persons.

As a full and complete understanding of the invention can only be imparted by a detailed description of the structure in which it is embodied, all further preliminary description will be omitted.

In the accompanying drawings, Figure 1 is a side elevation of a sleigh or cutter body constructed according to the present invention. Fig. 2 is a plan view of the same, showing one of the side doors opened. Fig. 3 is a sectional elevation taken upon the line $x$ $x$ of Fig. 2. Fig. 4 is a sectional elevation taken upon the line $v$ $v$ of Figs. 1, 2, and 3, looking toward the back of the vehicle, both of the side doors being closed. Fig. 5 is a like view taken upon the same line, looking in the opposite direction or toward the front of the vehicle. Fig. 6 is a horizontal section taken upon the line $x$ $x$ of Figs. 1, 3, and 5. Fig. 7 is a plan view similar to Fig. 2, showing both doors closed and the seats arranged to accommodate a larger number of persons. Fig. 8 is a sectional elevation taken upon the line $x$ $x$ of Fig. 7. Figs. 9 and 10 are side elevations similar to Fig. 1, illustrating modifications which will be hereinafter explained. Fig. 11 is a cross-section of one side of the body when the parts are in the position shown in Fig. 9. Fig. 12 is a similar view showing the side seat turned down to its horizontal position. Fig. 13 is a similar view when the parts are in the position shown in Fig. 10. Figs. 14 and 15 are views similar to Figs. 11 and 13, showing the back of the side seat arranged in a different manner.

Although in the accompanying drawings the invention is shown as embodied in a body which is of suitable design for a sleigh or cutter, it is not to be understood that the invention is limited in its application to the bodies of that class of vehicles, or to bodies of the particular design shown in the present case. The general form or design of the body may be varied greatly from that shown without departing from the invention, and the invention may be applied to the bodies of carriages or wagons equally as well as to those of sleighs or cutters.

Referring to the drawings, it will be seen that the body therein shown is of substantially the same general form as that of any ordinary double-seated sleigh or cutter. It is provided with the usual front and rear seats, A B, each of which, as shown, is of sufficient width to accommodate two or more persons. The front seat may, however, if preferred, be made of only sufficient width to accommodate the driver. These seats are provided with the usual cushions, 10 11, which may be secured permanently to the seats or made removable, as preferred. The sides and back of the body rise to a sufficient height to form the ends 12 and back 13 of the rear seat, B, and are provided upon the inside with the usual upholstering, 14. The body is provided just in the rear of the front seat, A, with a cross-partition, C, which rises to a sufficient height to form a suitable back to that seat, while the sides of the body rise so as to form its ends 15. The ends and back of this seat are also provided with the usual upholstering, 16. The body is provided with the usual side doors, D, which may be hinged so as to swing either to the front or rear, and are provided with the usual locking apparatus, 9. The rear seat, B, instead of being made in a single piece, as in the ordinary constructions, is made in three parts, 1 2 3, the end parts, 1 3, being permanently secured to the body, while the middle part, 2, is made capable of removal and is supported upon shoulders or ledges 4, formed upon the parts 1 3 and the back 13. The purpose of this construction will be made clear when the manner of using the seats is explained. When the cushion 11 is permanently attached to the seat B, it will be made in three parts corresponding to the parts 1 2

3 of the seat, as shown in the drawings; but when the cushion is made capable of removal it may be made in a single piece, if preferred. The inner corners of the parts 1 3 of the seat B are supported by means of brackets or braces 5, which are arranged as best shown in Fig. 4, so as to afford no obstruction and leave the entire space under the seat free and open for the storage of such articles as it is desired to carry. The partition C, which forms the back to the seat A, is provided at its ends with two hinged seats, E F, which are of just sufficient length to extend from the partition to the seat B. These hinged seats are so arranged that they can be turned down to a horizontal position, as shown in Figs. 7 and 8, so as to form seats along the sides of the body, or up to a vertical position, as shown in Figs. 2, 3, 5, and 6, so as to be entirely out of the way. The fronts of the parts 1 3 of the seat B are provided with shoulders or ledges 6, upon which the ends of the seats E F are supported when in their horizontal position, and the partition C is provided with recesses or chambers 20, which are of sufficient depth to receive the seats E F and their cushions 18, so that when they are turned up to their vertical position they shut in flush with the face of the partition, as shown in Figs. 3 and 6. The cushions 18 of the seats E F may be permanently secured to the seats or be made removable therefrom, as preferred. If the cushions are removable, the recesses 20 may be made of only sufficient depth to receive the seats, the cushions in such case being removed before the seats are turned up to their vertical position; and in some cases the recesses 20 may be entirely dispensed with, the seats being arranged to turn up against the partition C. This will not, however, be found as desirable as to have the seats fit into recesses in the partition. The seats E F are provided upon their under sides with ordinary spring bolts or catches, 7, or with some other similar devices by which they are secured in their raised or upturned position.

The manner of using the structure just described is as follows: When it is desired that the vehicle shall accommodate only two persons besides those occupying the front seat, the middle part, 2, of the seat B will be placed in position between the parts 1 3, as shown in Figs. 2 and 4, and the side seats, E F, will be turned up to their vertical position and secured against the partition C or in the recesses 20, as shown in Figs. 3, 5, and 6. When, however, it is desired that the seating capacity of the vehicle shall be increased so as to accommodate a greater number of persons, the part 2 of the seat B will be removed, and the side seats, E F, will be turned down to their horizontal position, as shown in Figs. 7 and 8. It will be observed that when the seats are arranged in this manner, instead of the one seat B extending crosswise of the body, there are provided two seats extending lengthwise of the body, each of which is equal or about equal in width to the seat B, thus doubling the seating capacity of the rear portion of the vehicle-body. When the seats are arranged in this manner, the upper portions, 21, of the doors D, together with the ends 12 of the seat B, afford backs to the two side seats, and consequently the insides of the portions 21 of the doors will preferably be provided with a suitable upholstering, 19, similar to that provided for the backs and ends of the seats A B. The doors D will also be provided upon the inside with buttons 8, or other similar means by which they will be prevented from springing when the persons occupying the seats lean heavily against them.

When the seats are to be arranged in the manner just described, it will of course be necessary for all the occupants to enter the vehicle before both of the seats E F are turned down to their horizontal position. This, however, can be readily done, a part of the occupants remaining standing until the door through which they have entered is closed and fastened and the corresponding one of the seats E F turned down. To get out of the vehicle, the operation will be reversed. The persons sitting on one of the seats E F will rise and stand until the seat is turned up and the door upon that side of the body opened.

It will readily be seen that many modifications may be made in the details of the construction hereinbefore described without departing from the essential features of the invention. If it should be desired to make the doors D of less height than shown in Figs. 1 to 8, it may readily be done by providing the seats E F with hinged backs, as shown in Figs. 9 to 13, inclusive. In the construction shown in these figures the backs 21 of the seats E F, instead of being formed by the upper portions of the doors D, are hinged to the rear or outside edges of the seats, and are arranged so as to be raised to a vertical position when the seats are turned down for use, as shown in Figs. 10 and 13, or turned down onto the seats, as shown in Fig. 12, so as to be turned up into the recesses 20 when the seats are raised to their vertical position, as shown in Figs. 9 and 11. The backs 21 will be provided at their ends with locking-bolts or other suitable means, by which they can be fastened in their raised position. In this construction the cushions 18 of the seats E F will preferably be made removable, so as to reduce as much as possible the depth of the recesses 20, and the doors D will be reduced in height, so as to only extend upward to the seats E F.

If preferred, the backs 21, instead of being hinged to the seats, may be hinged to the upper edges of the doors D, as shown in Figs. 14 and 15. In this construction the backs are arranged to fold down upon the insides of the doors when the seats E F are not in use, as shown in Fig. 14, or be turned up so as to form continuations of the doors when it is desired to bring the side seats into use, as shown in Fig. 15. In this case also the backs 21 will be provided with suitable locking-bolts for securing them in their raised position.

Although the invention is herein shown as applied to a vehicle having an open body, it will readily be seen that it is equally applicable to those vehicles in which the body is provided with a top or cover.

What I claim is—

1. A vehicle-body provided with a cross-seat, B, and with hinged seats E F, arranged to join with the cross-seat to form side seats upon each side of the body, substantially as described.

2. A vehicle-body provided with a cross-seat, B, having a removable middle part, 2, and with hinged seats E F, arranged to join with the ends of the cross-seat to form side seats upon each side of the body, substantially as described.

3. A vehicle-body provided with a cross-seat, B, having a removable middle part, 2, and with hinged seats E F, arranged to join with the ends of the cross-seat to form side seats upon each side of the body, and to be turned up into recesses 20 in the partition C when not in use, substantially as described.

4. A vehicle-body provided with side doors, D, and a cross-seat, B, having a removable middle part, 2, and with hinged seats E F, arranged to join with the ends of the cross-seat to form side seats upon each side of the body, and to be turned up into a vertical position when not in use, substantially as described.

5. A vehicle-body provided with a cross-seat, B, consisting of a removable middle part, 2, and stationary end parts, 1 3, and with the brackets or braces 5, arranged to support the inner corners of said parts 1 3, substantially as described.

In testimony whereof I have hereunto set my hand in the presence of two subscribing witnesses.

D. A. VANHORNE.

Witnesses:
D. H. ROBERTS,
T. H. PALMER.